(12) United States Patent
Ulaganathan et al.

(10) Patent No.: US 10,771,807 B1
(45) Date of Patent: Sep. 8, 2020

(54) SYSTEM AND METHOD FOR COMPRESSING VIDEO USING DEEP LEARNING

(71) Applicant: Wipro Limited, Bangalore (IN)

(72) Inventors: Sethuraman Ulaganathan, Tiruchirapalli (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/369,377

(22) Filed: Mar. 29, 2019

(30) Foreign Application Priority Data

Mar. 28, 2019 (IN) .............................. 201941012297

(51) Int. Cl.
| | |
|---|---|
| *H04N 19/52* | (2014.01) |
| *H04N 19/159* | (2014.01) |
| *H04N 19/184* | (2014.01) |
| *H04N 19/186* | (2014.01) |
| *G06F 17/15* | (2006.01) |
| *G06N 3/04* | (2006.01) |

(52) U.S. Cl.
CPC ............ *H04N 19/52* (2014.11); *G06F 17/15* (2013.01); *G06N 3/04* (2013.01); *H04N 19/159* (2014.11); *H04N 19/184* (2014.11); *H04N 19/186* (2014.11)

(58) Field of Classification Search
CPC .... H04N 19/52; H04N 19/159; H04N 19/184; H04N 19/186; G06F 17/15; G06N 3/04
See application file for complete search history.

(56) References Cited

U.S. PATENT DOCUMENTS

| | | | | |
|---|---|---|---|---|
| 2018/0124425 | A1* | 5/2018 | Van Leuven | ........ H04N 19/159 |
| 2018/0288406 | A1* | 10/2018 | Kouno | ................. H04N 19/103 |
| 2018/0350110 | A1* | 12/2018 | Cho | ..................... G06N 3/0454 |
| 2019/0045207 | A1* | 2/2019 | Chen | ....................... G06F 21/45 |
| 2019/0124348 | A1* | 4/2019 | Yang | ..................... G06N 20/00 |

OTHER PUBLICATIONS

Xu et al. "Reducing Complexity of HEVC: A Deep Learning Approach" Mar. 22, 2018, arXiv.*

(Continued)

*Primary Examiner* — Mohammed S Rahaman
(74) *Attorney, Agent, or Firm* — Finnegan, Henderson, Farabow, Garrett & Dunner, LLP

(57) ABSTRACT

A method and system for compressing videos using deep learning is disclosed. The method includes segmenting each of a plurality of frames associated with a video into a plurality of super blocks. The method further includes determining a block size for partition of each of the plurality of super blocks into a plurality of sub blocks, based on a feature of each of the plurality of super blocks using a Convolutional Neural Network (CNN). The method further includes generating a prediction data for each of the plurality of sub blocks based on a motion vector predicted and learned by the CNN. The method further includes determining a residual data for each of the plurality of sub blocks by subtracting the prediction data from an associated original data. The method includes generating a transformed quantized residual data using each of a transformation algorithm and a quantization algorithm.

20 Claims, 7 Drawing Sheets

(56) References Cited

OTHER PUBLICATIONS

Yuan "Quadtree Based Nonsquare Block Structure for Inter Frame Coding in High Efficiency Video Coding", IEEE Transactions on Circuits and Systems for Video Technology, vol. 22, No. 12, Dec. 2012.*

Wang et. al. "Fast QTBT Partitioning Decision for Interframe Coding With Convolution Neural Network", Oct. 2018, ICIP 2018.*

Chen et al. "CNN Oriented Fast CU Partition Decision and PU Mode Decision for HEVC Intra Encoding", Nov. 2018, 2018 14th IEEE International Conference on Solid-State and Integrated Circuit Technology (ICSICT).*

Chen et al, DeepCoder: A deep neural network based video compression, IEEE Visual Communications and Image Processing Conference (2017).

Fue et al., Texture Segmentation Based Video Compression Using Convolutional Neural Networks, Feb. 8, 2018, retrieved from Internet: <https//arxiv.org/abs/1802.02992>.

Zhao et al., Learning a Virtual Codec Based on Deep Convolutional Neural Network to Compress Image, Journal of Latex Class Files (2018).

Chakib et al., A Proposed Approach for Image Compression based on Wavelet Transform and Neural Network, International Journal of Advanced Computer Science and Applications, vol. 8, No. 9, (2017).

Kin et al., Video Compression Using Recurrent Convolutional Neural Networks, Standard.edu/reports (2017).

Chen et al., Learning for Video Compression (2018), retrieved from internet: <https://arXiv.org > cs > arXiv:1804.09869>.

Luo et al., DeepSIC: Deep Semantic Image Compression, (2018), retrieved from internet: <https://arxiv.org/abs/1801.09468.

\* cited by examiner

SYSTEM AND METHOD FOR COMPRESSING VIDEO USING DEEP LEARNING This application claims the benefit of Indian Patent Application Serial No. 201941012297, filed Mar. 28, 2019, which is hereby incorporated by reference in its entirety.

FIELD

This disclosure relates generally to video compression, and more particularly to a method and system for compressing videos using deep learning.

BACKGROUND

The importance of video compression has increased manifold due to an exponential increase in on-line streaming and increased volume of video storage on the cloud. In conventional video coding or compressing algorithms, block based compression is a common practice. The video frames may be fragmented into blocks of fixed size for further processing. However, the fragmentation may result in creation of redundant blocks which may increases the computation requirement. Further, use of hybrid video coding methods to decide the prediction modes may complicate the process.

Some of the conventional methods discuss video compression using learned dictionaries, either with fixed or self-adaptive atoms, plus fixed transform basis. In such methods, blocks may be represented by weighted dictionaries and transformed basis co-efficient. These conventional methods may implement deep learning for video compression; however, these conventional methods may not use variable block sizes and may set forth the idea of fixed size blocks for processing. This may further result in redundancy in processing as many of the blocks may have the same features.

SUMMARY

In one embodiment, a method of compressing videos using deep learning is disclosed. The method may include segmenting each of a plurality of frames associated with a video into a plurality of super blocks based on an element present in each of the plurality of frames and a motion associated with the element. The method may further include determining a block size for partition of each of the plurality of super blocks into a plurality of sub blocks, based on a feature of each of the plurality of super blocks using a Convolutional Neural Network (CNN). The method may further include generating a prediction data for each of the plurality of sub blocks based on a motion vector predicted and learned by the CNN, where the CNN predicts the motion vector based on a co-located frames. The method may further include determining a residual data for each of the plurality of sub blocks by subtracting the prediction data from an associated original data, wherein the associated original data is a bit stream of each of the plurality of sub blocks. The method may further include generating a transformed quantized residual data using each of a transformation algorithm and a quantization algorithm based on a plurality of parameters associated with the residual data such as the compression rate and Signal to noise ratio.

In another embodiment, a video compressing device in the cloud environment is disclosed. The video compressing device includes a processor and a memory communicatively coupled to the processor, where the memory stores processor instructions, which, on execution, causes the processor to segment each of a plurality of frames associated with a video into a plurality of super blocks based on an element present in each of the plurality of frames and a motion associated with the element. The processor instructions further cause the processor to determine a block size for partition of each of the plurality of super blocks into a plurality of sub blocks, based on a feature of each of the plurality of super blocks using a Convolutional Neural Network (CNN). The processor instructions further cause the processor to generate a prediction data for each of the plurality of sub blocks based on a motion vector predicted and learned by the CNN, where the CNN predicts the motion vector based on a co-located frames. The processor instructions further cause the processor to determine a residual data for each of the plurality of sub blocks by subtracting the prediction data from an associated original data, where the associated original data is a bit stream of each of the plurality of sub blocks. The processor instruction further causes the processor to generate a transformed quantized residual data using each of a transformation algorithm and a quantization algorithm based on a plurality of parameters associated with the residual data such as the compression rate and signal to noise ratio.

In yet another embodiment, a non-transitory computer-readable storage medium is disclosed. The non-transitory computer-readable storage medium has instructions stored thereon, a set of computer-executable instructions causing a computer comprising one or more processors to perform steps of segmenting each of a plurality of frames associated with a video into a plurality of super blocks based on an element present in each of the plurality of frames and a motion associated with the element; determining a block size for partition of each of the plurality of super blocks into a plurality of sub blocks, based on a feature of each of the plurality of super blocks using a Convolutional Neural Network (CNN); generating a prediction data for each of the plurality of sub blocks based on a motion vector predicted and learned by the CNN, wherein the CNN predicts the motion vector based on a co-located frames; determining a residual data for each of the plurality of sub blocks by subtracting the prediction data from an associated original data, wherein the associated original data is a bit stream of each of the plurality of sub blocks; and generating a transformed quantized residual data using each of a transformation algorithm and a quantization algorithm based on a plurality of parameters associated with the residual data such as the compression rate and signal to noise ratio.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
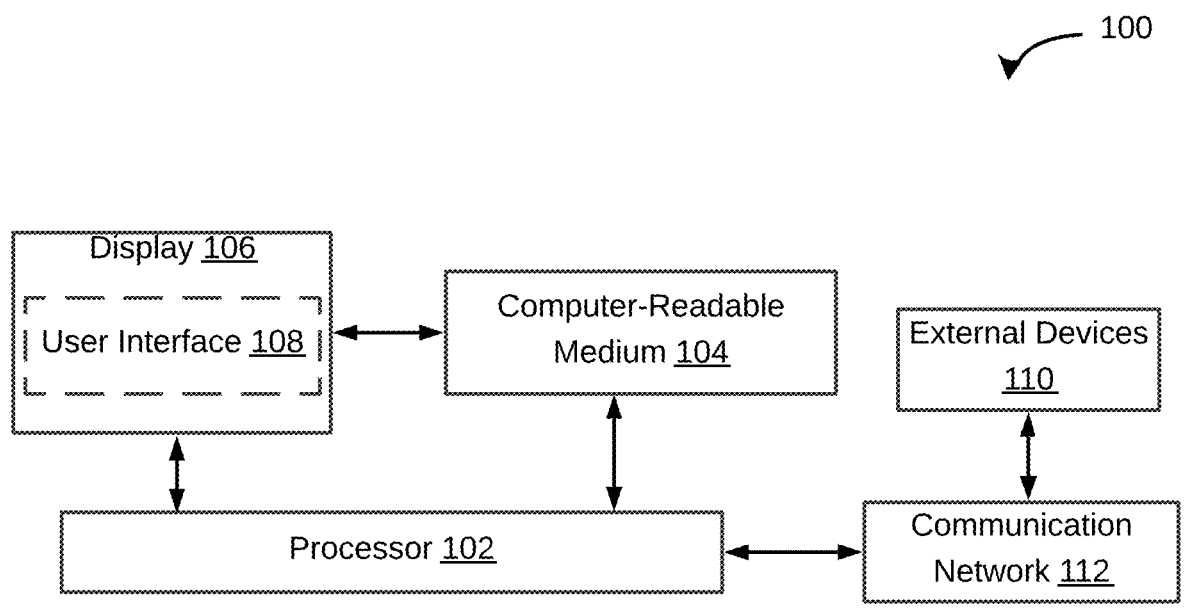
FIG. 1 is a block diagram of a system for compressing videos using deep learning, in accordance with an embodiment.

Referring now to FIG. 1, is a block diagram of a system 100 for compressing videos using deep learning is illustrated, in accordance with an embodiment. As will be appreciated, the system 100 may be implemented in a video compression device (not shown in FIG. 1). The video compression device may be further embedded in a server, a desktop, a laptop, a notebook, a netbook, a tablet, a smartphone, a mobile phone, or any other computing device.

The system 100 may provide an effective video compression using deep learning based segmented blocks, learned prediction modes, learned transformation and quantization using Convolutional Neural Network (CNN) equivalent of Discrete Cosine Transform (DCT), gaussian pulse wavelets to trade off bit-rate vs picture quality. Additionally, the system 100 may perform transformation and quantization using deep learning techniques. Further, to control a trade-off between bit-rate vs picture quality, gaussian pulses and wavelets may be used. Moreover, the data may be binarized using entropy coding to create a compressed bit-stream.

The system 100 may include a processor 102, a computer-readable storage medium 104 (for example, a memory), and a display 106. The computer-readable storage medium 104 may store instructions that, when executed by the processor 102, may cause the processor 102 to manage resources within the cloud environment. The computer-readable storage medium 104 may also store various data (for example, predefined threshold range, attributes associated with an event, and the like) that may be captured, processed, and/or required by the system 100. The system 100 may interact with a user via a user interface 108 accessible via the display 106. The system 100 may also interact with one or more of external devices 110 over a communication network 112 for sending or receiving various data. The external devices 110 may include, but may not be limited to a remote server, a digital device, or another computing system. The system 100 may also be adapted to exchange data with other components or service providers using the communication network 112, for example, Wide Area Network (WAN) or the Internet.

Figure 2:
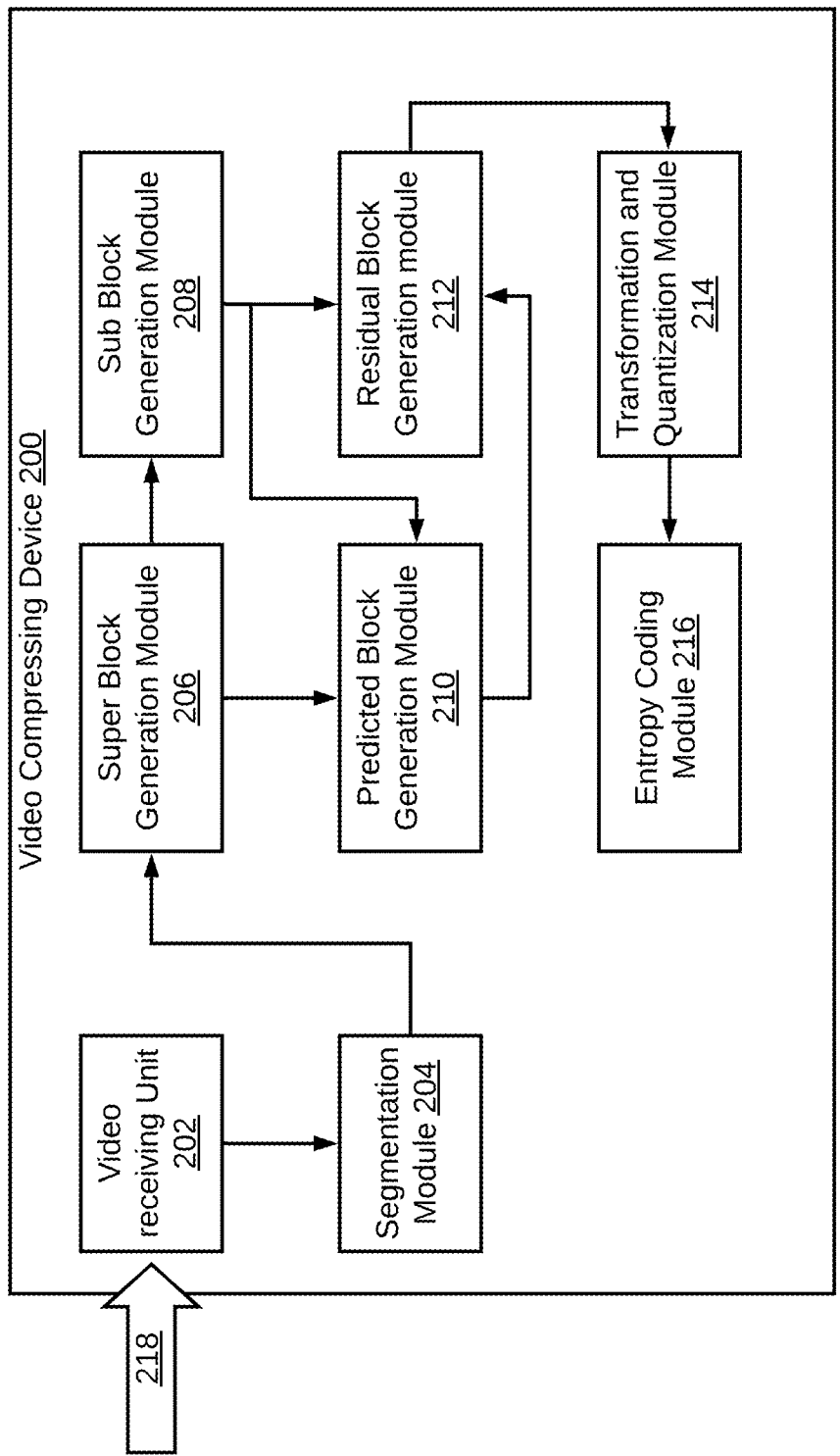
FIG. 2 illustrates a block diagram of an internal architecture of a video compressing device that is configured to compress videos using deep learning, in accordance with an embodiment.

Referring now to FIG. 2, a block diagram of an internal architecture of a video compressing device 200 that is configured to compress videos using deep learning is illustrated, in accordance with an embodiment. The video compressing device 200 may include a video receiving unit 202, a segmentation module 204, a super block generation module 206, a sub block generation module 208, a predicted block generation module 210, a residual block generation module 212, a transformation and quantization module 214, and an entropy encoding module 216. As will be appreciated by those skilled in the art, all such aforementioned modules 202-216 may be represented as a single module or a combination of different modules. Moreover, as will be appreciated by those skilled in the art, each of the modules 202-216 may reside, in whole or in parts, on one device or multiple devices in communication with each other.

The video receiving unit 202 may be communicatively coupled to the segmentation block 204. The video receiving unit 202 may be configured to receive, from an interface 218, a video that is required to be compressed. The interface 218 may connect the video compressing device with one or more external devices (not shown in FIG. 2). The interface 218, for example, may include one or more of, but is not limited to Bluetooth, NFC, FireWire, Camera Link®, USB 2.0, USB 3.0, GigE, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High Speed Packet Access (HSPA+), Global System For Mobile Communications (GSM), Long Term Evolution (LTE), WiMax, or the like.

The video received by the video receiving unit 202 may include a plurality of frame and each of the plurality of frames may have a foreground and a background. The foreground may be a part of a given frame which may change with respect to one or more previous frame or the past frame. In contrast, the background of the given frame may be the part of the given frame which may not change with respect to one or more previous frames (or past frames) with respect to the given frame. The video receiving unit 202 may also store the video and may perform pre-processing on the video. By way of an example, the video receiving unit 202 may perform one or more pre-processing steps that may include, but are not limited to converting a color spaces from the Red Green Blue (RGB) color space to YCbCr color space, removing a noise from the video, and providing quality improvements in subjective quality of the video. Further, after pre-processing the video, the video receiving unit 202 may feed the video to the segmentation module 204.

After receiving the video from the video receiving unit 202, the segmentation module 204 may segment each of the plurality of frames of the video into a plurality of super blocks, based on the elements present in the image frame and the motion associated with the elements using deep learning based segmentation algorithms. The elements present in the image frame may include, but are not limited to various objects present in the frame and texture associated with the objects. It should be noted that the segmentation module 204 may segment each of the plurality of frames into a plurality of super blocks of a variable size and shape (in other words, arbitrary shape or size), which is based on the motion associated with objects in each of the plurality of frames. This is done to differentiate high motion parts with tiny objects (which may indicate an action sequence), no moving parts (which may act as the background), and medium moving parts. This is further explained in detail in conjunction with FIG. 3 to FIG. 6. Further, after segmenting each of the plurality of frames associated with the video into a plurality of super blocks, the segmentation module 204 may feed the plurality of super blocks to the super block generation module 206.

After receiving the plurality of super blocks from the segmentation block 204, the super block generation module 206 may learn features of each of the plurality of super blocks to determine a block size for partitioning each of the plurality of super blocks into a plurality of sub blocks, prediction mode for each of the plurality of sub blocks, and motion vectors associated with each of the plurality of sub blocks. The super block generation module 206 may include a Convolutional Neural Network (CNN) that may be trained using a learning data set that includes an existing conventional video coding algorithms and a user feedback. Based on the trained CNN, the super block generation module 206 may determine a block size of each of the plurality of sub blocks. The block size of each of the plurality of sub blocks (represented in pixels) may include one or more of, but not limited to 16×16, 8×8, 4×4, or the like. This is further explained in detail in conjunction with FIG. 3 to FIG. 6. The super block generation module 206 may then share the block size determined for each of the plurality of sub blocks to be generate from the plurality of super blocks the sub block generation module 208. The super block generation module 206 may also be communicatively coupled to the predicted block generation module 210.

When the sub block generation module 208 receives the plurality of super blocks and the block size of each of a plurality of sub blocks from the super block generation module 206, the sub block generation module 208 may segment each of the plurality of super blocks into the plurality of sub blocks based on the associated block size determined for each of the plurality of sub blocks. This is further explained in detail in conjunction with FIG. 3 to FIG. 6. Thereafter, the sub block generation module 208 shares the plurality of sub blocks with the prediction block generation module 210.

Once the predicted block generation module 210 receives the plurality of sub blocks, the predicted block generation module 210 may generate a predicted block for each of the plurality of sub blocks based on the learned prediction mode. The learned prediction mode may be shared by the super block generation module 206 with the predicted block generation module 210. The learned prediction mode may be one or more of an intra mode or an inter mode. The intra mode may be prediction within a given frame and the inter mode prediction may be prediction of the given frame with respect to one or more preceding or succeeding frames. In the predicted block generation module 210, the CNN may be trained to select a suitable learned prediction mode based on one or more of a sub block content in the given frame, reconstruction of the neighboring sub blocks within the frame and content of one or more co-located frames. The CNN may further predict a motion vector in the given frame based on the one or more co-located frames. The predicted block generation module 210 may share information associated with predicted blocks determined for the plurality of sub blocks in the given frame which is in motion with the residual block generation module 212.

The residual block generation module 212 may receive the plurality of sub blocks from the sub block generation module 208 and predicted blocks determined for each of the plurality of frames from the predicted block generation module 210. Thereafter, the residual block generation module 212 may determine residual data (that may be used to generate a plurality of residual blocks) based on the plurality of sub blocks and the predicted blocks. The residual data may be determined in each frame by subtracting a predicted block from an associated sub block from the plurality of sub blocks. The residual block generation module 212 may then share the residual blocks with the transformation and quantization module 214.

The transformation and quantization module 214 may perform a transformation and quantization algorithm on the residual blocks, based on a plurality of parameters associated with the residual blocks, to generate a transformed quantized residual data. The plurality of parameters may include, but are not limited to one or more of compression rate, signal to noise ratio, and the like. The transformation algorithm may be one or more of the CNN, a gaussian pulse wavelet, or the like. Each residual block is transformed and quantized in order to compress the data. The transformation may be performed using a CNN equivalent of Discrete Cosine Transform (DCT). During the transformation process, transform and quantification parameters are learned using deep-learning techniques. Further, in order to control the trade-off between bit-rate vs picture quality gaussian pulses and wavelets may be used. This is further explained in detail in conjunction with FIG. 3 to FIG. 6. Further, the transformation and quantization module 214 may share the transformed quantized residual data with the entropy encoding module 216.

The entropy encoding module 216 may receive the transformed quantized residual data from the transformation and quantization module 214. The entropy encoding module 216 may then generate a compressed bit stream by means of entropy coding for the transformed quantized residual data. Modules within the video compressing device 200 may be connected by employing connections that use protocol, which may include, but is not limited to RS-232, RS-422, RS-485, I2C, Serial Peripheral Interface (SPI), Microwire, 1-Wire, IEEE 1284, Intel Quick Path Interconnect, Infini-Band connectors.

Figure 3:
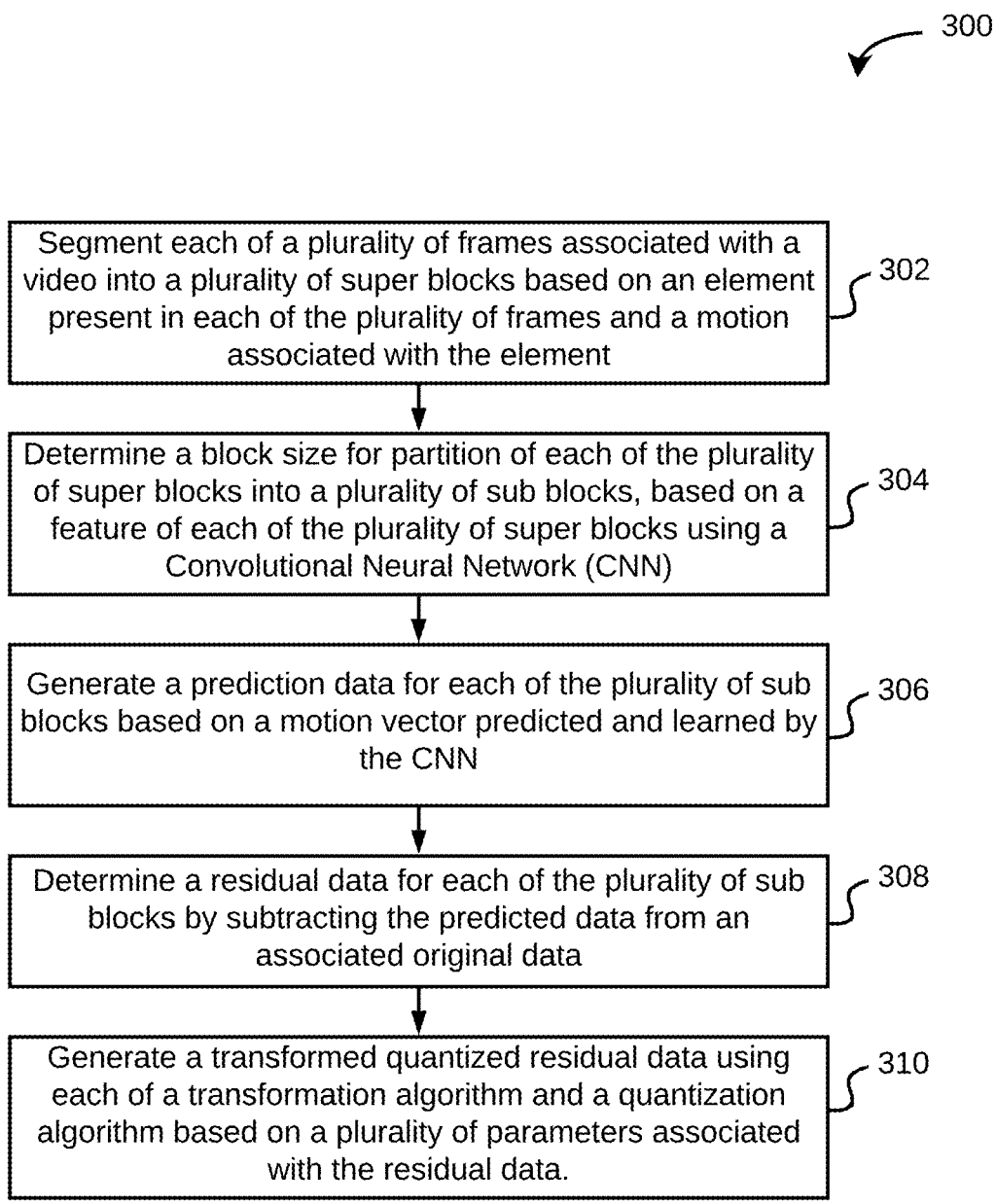
FIG. 3 illustrates a flowchart of a method for compressing videos using deep learning, in accordance with an embodiment.

Referring now to FIG. 3, a flowchart of a method 300 for compressing videos using deep learning is illustrated, in accordance with an embodiment. The video compressing device 200 may receive a video from an external computing device through an interface and perform pre-processing analytics on the video. The pre-processing analytics may include, but are not limited to removal of noise and converting of Red Green Blue (RGB) color space to YCbCr color space.

After the video has been pre-processed, the video compressing device 200, at step 302, may segment each of the plurality of frames associated with the video into a plurality of super blocks, based on an element present in each of the plurality of frames and a motion associated with the element. The element, for example, may include, but is not limited to various objects and textures present in each of the plurality of frames. The plurality of super blocks may be of variable size in order to differentiate high motion parts with tiny objects (or the foreground), no moving parts (or the background), and medium moving parts. The plurality of super blocks may be generated using deep learning based segmentation techniques.

At step 304, the video compressing device 200 may use a CNN to determine a block size for partition of each of the plurality of super blocks into a plurality of sub blocks. The CNN may determine the block size for partition based on a feature of each of the plurality of super blocks using the CNN. The feature, for example, may include, but is no limited to one or more of a size of the super block and motion related information. The video compressing device 200 may train the CNN for each of the plurality of super blocks, based on features of a plurality of set of frames associated with a plurality of video compression techniques and a user feedback to the CNN. Additionally, the video compressing device 200, through the trained CNN may predict, for each of the plurality of super blocks, one or more of the prediction data, the block size, or motion related information.

The video compressing device, at step 306, may generate a prediction data for each of the plurality of sub blocks based on a motion vector predicted and learned by the trained CNN. Moreover, the trained CNN predicts the motion vector based on co-located frames. The trained CNN may select a suitable prediction mode which may be one of an inter mode or an intra mode. The inter mode may include prediction between the frame and one or more adjacent frames within the plurality of frames and the intra mode may include prediction within the frame.

The video compressing device 200 may implement an Intra-coded frame (I-frame) and a Predicted frame (P-frame). The I-frame may be considered as a reference frame and with respect to the I-frame, the video compressing device 200 may identify differences (such as motion vector) in a given frame with respect to the previous frame. Additionally, the video compressing device 200 may determine the difference when compared with an already sent frame. Hence, the video compressing device 200 may transmit the difference and store the same after compressing the video.

At step 308, the video compressing device 200 may determine a residual data for each of the plurality of sub blocks by subtracting the predicted data from an associated original data. The associated original data may be a bit stream associated with each of the plurality of sub blocks. Thereafter, at step 310, the video compressing device 200 may generate a transformed quantized residual data using each of a transformation algorithm and a quantization algorithm based on a plurality of parameters associated with the residual data. The plurality of parameters may include, but are not limited to compression rate and signal to noise ratio. The transformation algorithm and the quantization algorithm may be applied to compress the residual data and the transformation algorithm may be based on at least one of the CNN or the gaussian pulse wavelet. The video compressing device 200 may then generate a plurality of compressed bit streams for the transformed quantized residual data based on an entropy coding.

Figure 4:
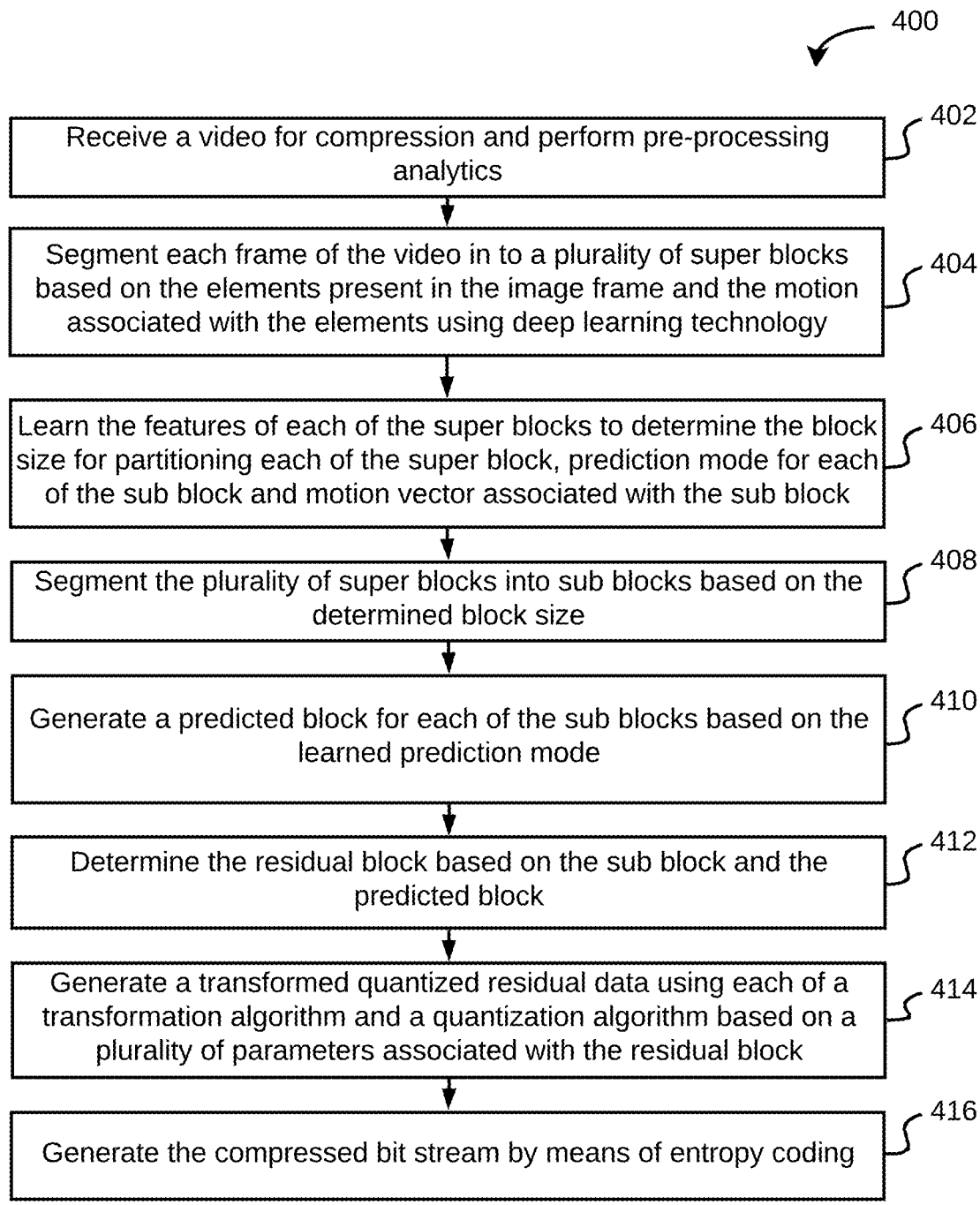
FIG. 4 illustrates a flowchart of a method for compressing videos using deep learning, in accordance with another embodiment.

Referring now to FIG. 4, a flowchart of a method 400 for compressing videos using deep learning is illustrated, in accordance with an embodiment. At step 402, the video compressing device 200 may receive a video that is required to be compressed. The video compressing device 200 may then perform pre-processing analytics on the video. This has already explained in detail in conjunction with FIG. 3. At step 404, the video compressing device 200 may segment each frame of the video into a plurality of super blocks based on the elements present in the image frame and the motion associated with the elements using deep learning technology by means of segmentation module. Further, at step 406, the video compressing device 200 may learn the features of each of the plurality of super blocks to determine the block size for partitioning each of the plurality of super blocks, prediction mode for each of the plurality of sub blocks, and motion vector associated with each of the plurality of sub blocks.

At step 408, the video compressing device 200 may segment the plurality of super blocks into sub blocks based on the determined block size. Further at step 410, the video compressing device 200 may generate a predicted block for each of the sub blocks based on the learned prediction mode. At step 412, for each of the plurality of sub blocks, the video compressing device 200 may determine a residual block based on the associated sub block and the associated predicted block. At step 414, the video compressing device 200 may generate a transformed quantized residual data using each of a transformation algorithm and a quantization algorithm based on a plurality of parameters associated with the residual data. At step 416, the video compressing device 200 may generate the compressed bit stream by means of entropy coding.

Figure 5:
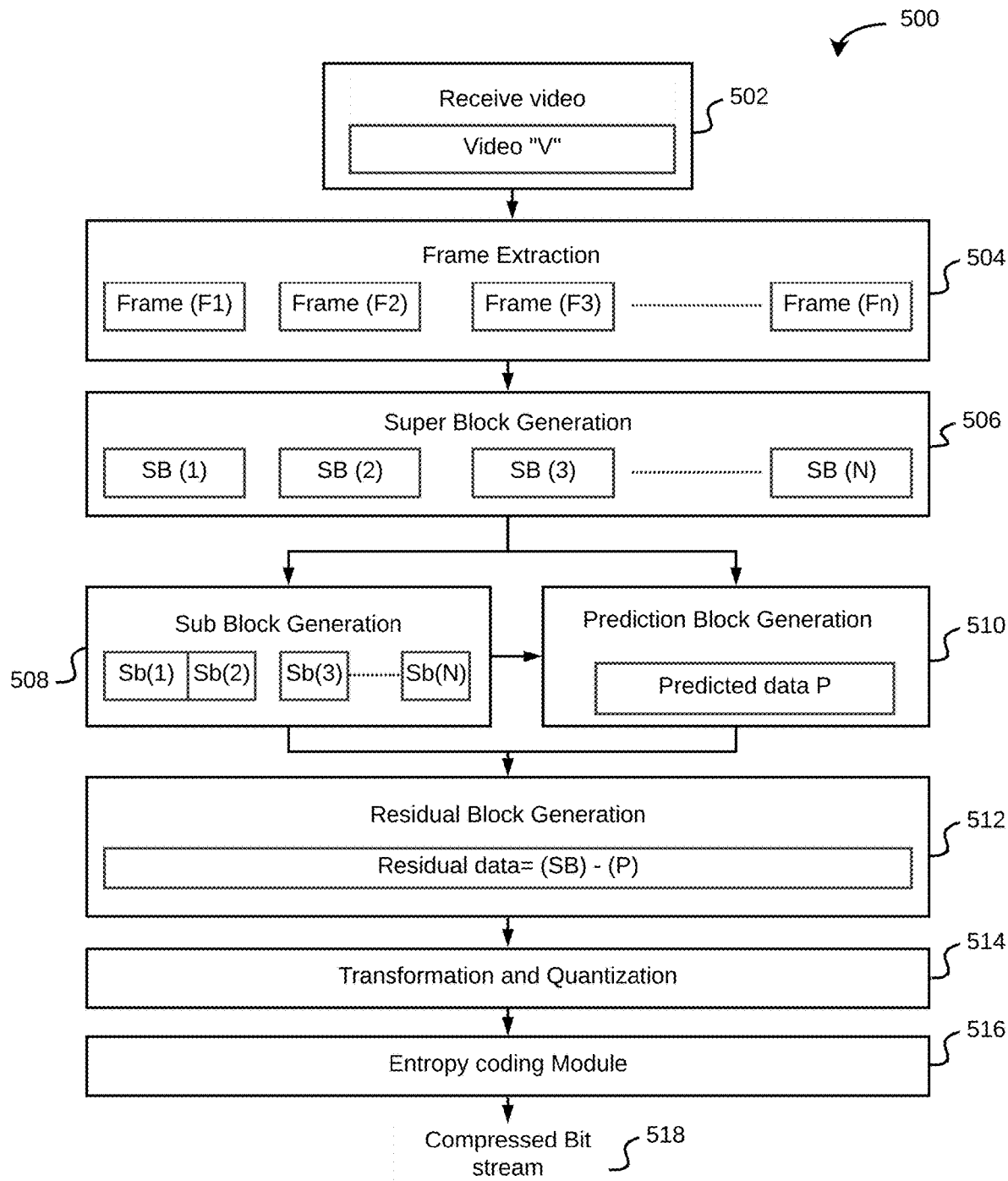
FIG. 5 illustrates a flow diagram depicting processing of a video through various components of a video compressing device configured to compress videos using deep learning, in accordance with an embodiment.
Figure 6:
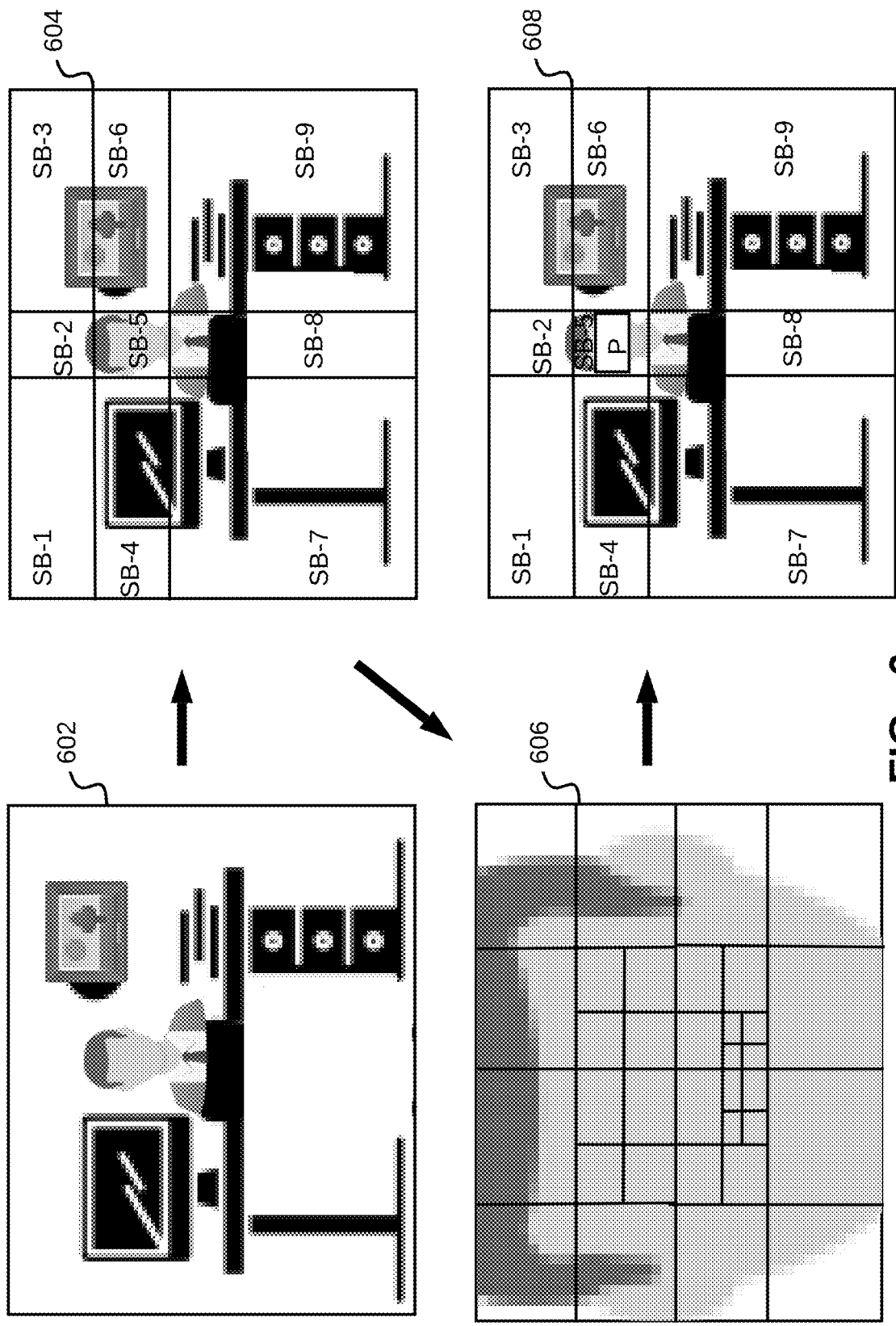
FIG. 6 illustrates step wise compressing of a video of a news anchor on a news channel, in accordance with an exemplary embodiment.

Referring now to FIG. 5, a flow diagram 500 depicting processing of a video through various module of the video compressing device 200 configured to compress videos using deep learning, in accordance with an embodiment. Additionally, referring to FIG. 6, step wise compressing of a video of a news anchor on a news channel is illustrated, in accordance with an exemplary embodiment. It will be apparent that both FIG. 5 and FIG. 6 are described in conjunction for ease of explanation.

At 502, the video compressing device 200 may receive the video 'V' and may perform the pre-processing on the video 'V.' The pre-processing on the video may include removal of noise, conversion of the RGB color space to YCbCr color space or the like. By way of an example, the video may be that of a news reader reading news on a news channel.

At 504, the video compressing device 200 may extract the plurality of frames (for example F1, F2, F3 . . . Fn) associated with the video 'V.' Each of the plurality of frames may include one or more of a foreground and a background. The foreground may be the part of a given frame which may change in their subsequent frames, whereas the background may be the part of the frame which may not changes in subsequent frames. By way of an example and referring to FIG. 6, the video may be divided into multiple frames after preprocessing. Out of these multiple frames, a frame 602 associated with the video may be selected. In the frame 602, the entire face of the news anchor may be the foreground because while reading news there may be a change in facial expressions of the news anchor (for example, lip movement, widening of eyes, or smile etc.) The remaining part of the frame 602 may be considered as the background.

At 506, the video compressing device 200 may select the frame F1 to encode. Hence, the frame F1 may be segmented into a plurality of super blocks (for example, SB1, SB2, . . . SB (N)) using deep learning based on the element or content present in the frame F1 and motion associated with the elements within the frame F1. Moreover, the video compression device 200 may determine the regions (i.e., the foreground regions and the background regions) that may be grouped together. It should be noted that after grouping, the foreground region and the background regions may be in arbitrary shapes. Moreover, the video compressing device 200 may create bounding box (rectangular or square in shape) within these regions as the entire encoding may be based on bounding boxes. The bounding boxes may be created based on the intelligence of the CNN. The bounding boxes may be termed as super blocks.

By way of an example and referring to FIG. 6, as depicted in 604, the video compressing device 200 may segment the frame 602 into the plurality of superblocks SB1, SB2, SB3, SB4, SB5, SB6, SB7, SB8, and SB9 (represented by bounding boxes). The video compressing device 200 may segment the frame 602 into bounding boxes of size: 16*16, 8*8, 4*4 or the like, based on features of the elements present in the frame 602. In the plurality of super blocks of this example, the super block SB5 may be identified as the foreground, as the super block SB5 may include the face of the news anchor, which would be in motion. Additionally, the super blocks SB1, Sb2, SB3, SB4, SB6, SB7, SB8, and SB9 may be the background within the frame 602, as these super blocks may include objects which may stationary or constant. Hence, the video compressing device 200 may create a plurality of sub blocks within the super block SB5 in order to predict motion.

At step 508, the video compression device 200 may generate a plurality of sub blocks, i.e., Sb1, Sb2, Sb3, ... Sb(n) based on a block size determined based on the motion in the super block. The motion vector may be determined by the CNN using the co-located frames. By way of an example and referring to FIG. 6, at 606 the video compressing device 200 may create a plurality of sub blocks within the super block SB5. The super block SB5 may be of the size 16*16, which may further be divided into four 8*8 sub blocks. Each of the 8*8 sub blocks may further be divided into four 4*4 block, which may further be divided into four 2*2 block. Hence the super blocks may be divided from 16*16 to 2*2, based on the prediction of the motion in the frame. As a result, there may be more number of sub blocks near lips and eyes of the news anchor, because there may be motion in lips and expression of eyes may change while dictating the news.

At 510 the video compressing device 200 may generate the predicted data 'P' (in the form a predicted sub block) in the super block. The predicted data 'P' may be a part of the frame F1 which may be motion. For generating the prediction data, the prediction mode may be at least one of the inter mode or the intra mode. These have been discussed before in detail. Additionally, the suitable mode of prediction out of the inter mode and intra mode may be identified by the CNN based on at least one of the sub block content in frame F1, the neighboring reconstructed blocks in the frame F1, and the co-located frame content. In other words, the CNN may be trained to predict the suitable mode of prediction (inter mode or intra mode), the block size, the prediction data and the motion related information. By way of an example and referring to FIG. 6, the video compressing device 200 may generate the prediction data P in the super block SB 5. This is depicted by 608 in FIG. 6. The prediction data P may be generated only in the super block SB5, as in the video of the news anchor, the content within the super block SB5 was in motion. It will be apparent to a person skilled in the art that when motion may be present in two super blocks, then predicted data may be generated corresponding to these two super blocks.

At 512, the video compressing device 200 may determine the residual data by subtracting the predicted data P from the original data. Hence, the residual data may be the part of the frame F which may not be in motion or the background part of the frame F. The computation of residual data is depicted by equation 1 given below:

Residual data (R)=Original Data (O)−Predicted Data (P)  (1)

At 514, the video compressing device 200 may perform transformation and quantization over the residual data. It should be noted that the video compressing device 200 may use at least one of the gaussian pulse wavelet or the CNN for performing transformation on the residual data. Advantage of the gaussian pulse wavelet is that there may be only two parameters, such as, a mean and a variance. Additionally, in most of the cases the video compressing device 200 may take symmetrical gaussian pulse, in which the mean may be zero. Hence, the video compressing device 200 may have to deal only with one parameter that is variance. Further, the video compressing device 200 may perform quantization. At step 516 the video compression device 200 may generate a compressed bit stream 518 by means of entropy coding for the transformed and quantized residual data.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
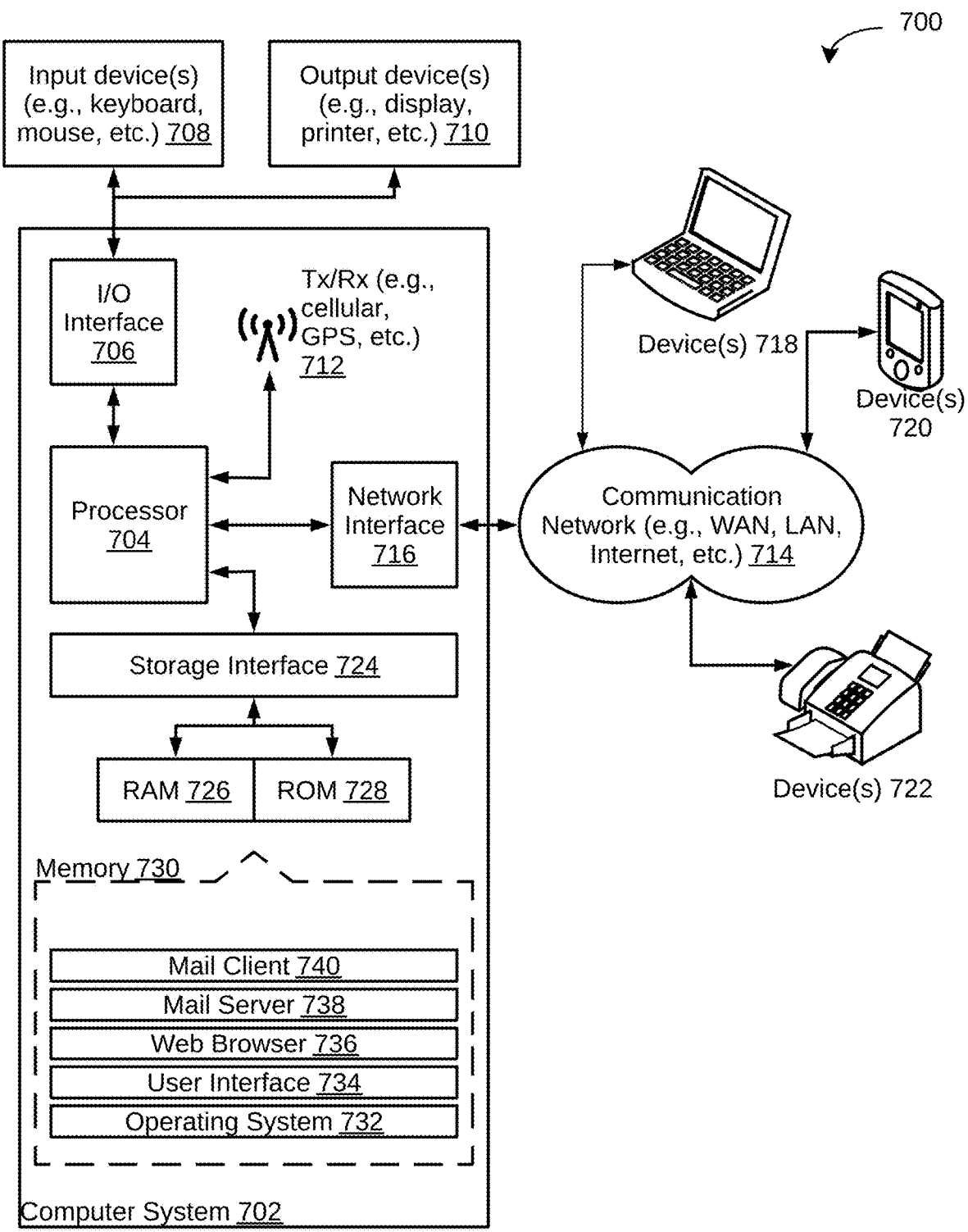
FIG. 7 is a block diagram of an exemplary computer system for implementing embodiments.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 714. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for compressing videos using deep learning. In particular, the method uses deep learning technique for effective video compression based on segmentation. Further the method may identify best prediction mode using deep learning of generating predicted block. The method may perform transformation and quantification using CNN equivalent of DCT or gaussian pulse wavelets to trade off bit-rate vs picture quality Block based coding techniques as used in the method increase the compression at the same time to maintain the quality for the current bandwidth availability and reduces the time required to compress the video to a greater extent. Further, the method helps to reduce the manual effort and the workload, which further reduces cost of memory.

The specification has described system and method of compressing videos using deep learning. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of compressing videos using deep learning, the method comprising:
   segmenting, by a video compressing device, each of a plurality of frames associated with a video into a plurality of super blocks based on an element present in each of the plurality of frames and a motion associated with the element, wherein the segmentation of the plurality frames into the plurality of super blocks is of variable shape and size;
   determining, by the video compressing device, a block size for partition of each of the plurality of super blocks into a plurality of sub blocks, based on a feature of each of the plurality of super blocks using a Convolutional Neural Network (CNN), wherein the feature comprises at least one of a size of the super block and a motion related information;
   generating, by the video compression device, a prediction data for each of the plurality of sub blocks based on a motion vector predicted and learned by the CNN, wherein the CNN predicts the motion vector based on a co-located frames;
   determining, by the video compression device, a residual data for each of the plurality of sub blocks by subtracting the prediction data from an associated original data, wherein the associated original data is a bit stream of each of the plurality of sub blocks; and
   generating, by the video compressing device, a transformed quantized residual data using each of a transformation algorithm and a quantization algorithm based on a plurality of parameters associated with the residual data, wherein the plurality of parameters comprises the compression rate and signal to noise ratio.

2. The method of claim 1, further comprising:
   receiving the video from an external computing device through an interface; and
   performing pre-processing analytics on the video, wherein the pre-processing analytics comprises at least one of removal of noise or converting of Red Green Blue (RGB) color space to YCbCr color space.

3. The method of claim 1, further comprising training the CNN for each of the plurality of super block based on the feature of a plurality of set of frames associated with a plurality of video compression techniques and a user feedback to the CNN.

4. The method of claim 3, further comprising predicting, by the trained CNN, for each of the plurality of super blocks, at least one of a prediction data, the block size, or a motion related information.

5. The method of claim 1, further comprising selecting, by the CNN, a suitable prediction mode, wherein the suitable prediction mode is at least one of an inter mode or an intra mode.

6. The method of claim 5, wherein the inter mode comprises prediction between a frame and at least one adjacent frame within the plurality of frames, and wherein the intra mode comprises prediction within the frame.

7. The method of claim 1, wherein the transformation algorithm and the quantization algorithm is applied to compress the residual data.

8. The method of claim 7, wherein the transformation algorithm is based on at least one of the CNN or a gaussian pulse wavelet.

9. The method of claim 1, further comprising generating a plurality of compressed bit streams for the transformed quantized residual data based on an entropy coding.

10. The method of claim 1, wherein the element comprises at least one of an object present in a frame of the plurality of frames and texture associated with the object.

11. A video compressing device using deep learning, the video compressing device comprising:
   a processor; and
   a memory communicatively coupled to the processor, wherein the memory stores processor instructions, which, on execution, causes the processor to:
      segment each of a plurality of frames associated with a video into a plurality of super blocks based on an element present in each of the plurality of frames and a motion associated with the element, wherein the segmentation of the plurality of frames into the plurality of super blocks is of variable shape and size;
      determine a block size for partition of each of the plurality of super blocks into a plurality of sub blocks, based on a feature of each of the plurality of super blocks using a Convolutional Neural Network (CNN), wherein the feature comprises at least one of a size of the super block and a motion related information;
      generate a prediction data for each of the plurality of sub blocks based on a motion vector predicted and learned by the CNN, wherein the CNN predicts the motion vector based on a co-located frames;
      determine a residual data for each of the plurality of sub blocks by subtracting the prediction data from an associated original data, wherein the associated original data is a bit stream of each of the plurality of sub blocks; and
      generate a transformed quantized residual data using each of a transformation algorithm and a quantization algorithm based on a plurality of parameters associated with the residual data, wherein the plurality of parameters comprises the compression rate and Signal to noise ratio.

12. The video compressing device of claim 11, wherein the processor instructions further cause the processor to:
   receive the video from an external computing device through an interface; and
   perform pre-processing analytics on the video, wherein the pre-processing analytics comprises at least one of removal of noise or converting of Red Green Blue (RGB) color space to YCbCr color space.

13. The video compressing device of claim 11, further comprising training the CNN for each of the plurality of super block based on the feature of a plurality of set of frames associated with a plurality of video compression techniques and a user feedback to the CNN.

14. The video compressing device of claim 13, further comprising predicting, by the trained CNN, for each of the plurality of super blocks, at least one of a prediction data, the block size, or a motion related information.

15. The video compressing device of claim 11, further comprising selecting, by the CNN, a suitable prediction mode, wherein the suitable prediction mode is at least one of an inter mode or an intra mode.

16. The video compressing device of claim 15, wherein the inter mode comprises prediction between a frame and at least one adjacent frame within the plurality of frames, and wherein the intra mode comprises prediction within the frame.

17. The video compressing device of claim 11, wherein the transformation algorithm and the quantization algorithm is applied to compress the residual data.

18. The video compressing device of claim 17, wherein the transformation algorithm is based on at least one of the CNN or a gaussian pulse wavelet.

19. The video compressing device of claim 11, further comprising generating a plurality of compressed bit streams for the transformed quantized residual data based on an entropy coding.

20. A non-transitory computer-readable storage medium having stored thereon, a set of computer-executable instructions causing a computer comprising one or more processors to perform steps comprising:
   segmenting each of a plurality of frames associated with a video into a plurality of super blocks based on an element present in each of the plurality of frames and a motion associated with the element, wherein the segmentation of the plurality of frames into the plurality super blocks is of variable shape and size;
   determining a block size for partition of each of the plurality of super blocks into a plurality of sub blocks, based on a feature of each of the plurality of super blocks using a Convolutional Neural Network (CNN), wherein the feature comprises at least one of a size of the super block and a motion related information;
   generating a prediction data for each of the plurality of sub blocks based on a motion vector predicted and learned by the CNN, wherein the CNN predicts the motion vector based on a co-located frames;
   determining a residual data for each of the plurality of sub blocks by subtracting the prediction data from an associated original data, wherein the associated original data is a bit stream of each of the plurality of sub blocks; and
   generating a transformed quantized residual data using each of a transformation algorithm and a quantization algorithm based on a plurality of parameters associated with the residual data, wherein the plurality of parameters comprises the compression rate and Signal to noise ratio.

* * * * *